United States Patent
Andersson et al.

(10) Patent No.: US 10,955,088 B2
(45) Date of Patent: Mar. 23, 2021

(54) FUEL TANK ARRANGEMENT WITH A GAS BURNING ARRANGEMENT AND A PRESSURE CONTROLLED VALVE TO HEAT AUXILIARY VEHICLE COMPONENTS

(71) Applicant: Volvo Truck Corporation, Gothenburg (SE)

(72) Inventors: Lennart Andersson, Varberg (SE); Marcus Leidefeldt, Gothenburg (SE); Ingemar Magnusson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/465,634

(22) PCT Filed: Nov. 30, 2017

(86) PCT No.: PCT/EP2017/081004
§ 371 (c)(1),
(2) Date: May 31, 2019

(87) PCT Pub. No.: WO2018/100073
PCT Pub. Date: Jun. 7, 2018

(65) Prior Publication Data
US 2020/0025337 A1     Jan. 23, 2020

(30) Foreign Application Priority Data

Dec. 1, 2016  (WO) ............... PCT/EP2016/079409

(51) Int. Cl.
*F17C 7/04*     (2006.01)
*F01N 3/02*     (2006.01)
*F02M 21/02*    (2006.01)

(52) U.S. Cl.
CPC .............. *F17C 7/04* (2013.01); *F01N 3/0205* (2013.01); *F02M 21/0221* (2013.01);
(Continued)

(58) Field of Classification Search
CPC ............... F02M 21/0287; F02M 21/06; F02D 19/06–105; F17C 9/00–04; F17C 7/04
See application file for complete search history.

(56) References Cited

U.S. PATENT DOCUMENTS

| | | | | |
|---|---|---|---|---|
| 5,248,567 A | * | 9/1993 | Amemiya | ............... C01B 3/384 429/413 |
| 5,540,208 A | * | 7/1996 | Kikutani | ................. F02B 43/00 123/518 |

(Continued)

FOREIGN PATENT DOCUMENTS

| CN | 102505999 A | 6/2012 |
|---|---|---|
| CN | 106062328 A | 10/2016 |

(Continued)

OTHER PUBLICATIONS

International Preliminary Report on Patentability for International Patent Application No. PCT/EP2017/081004, dated Mar. 26, 2019, 7 pages.

(Continued)

*Primary Examiner* — Laert Dounis
(74) *Attorney, Agent, or Firm* — Withrow & Terranova PLLC

(57) ABSTRACT

The present invention relates to a fuel tank arrangement (100) for an internal combustion engine (2) of a vehicle, the fuel tank arrangement (100) comprising a fuel tank (101) for containing a combustible gas; wherein the fuel tank arrangement further comprises a combustible gas burning arrangement (106) for combustion of combustible gas, said combustible gas burning arrangement (106) being positioned in downstream fluid communication with the fuel tank (101) via a first conduit.

15 Claims, 5 Drawing Sheets

(52) U.S. Cl.
CPC .... *F02M 21/0239* (2013.01); *F02M 21/0245* (2013.01); *F02M 21/0287* (2013.01); *F17C 2221/033* (2013.01); *F17C 2227/0135* (2013.01); *F17C 2227/0302* (2013.01); *F17C 2250/03* (2013.01); *F17C 2270/0171* (2013.01)

(56) References Cited

U.S. PATENT DOCUMENTS

| | | | |
|---|---|---|---|
| 5,701,928 | A | 12/1997 | Aoki |
| 8,925,518 | B1 * | 1/2015 | Riley .................. F02B 19/10 123/261 |
| 2005/0193989 | A1 | 9/2005 | Veenstra et al. |
| 2013/0228151 | A1 | 9/2013 | Dunn et al. |
| 2014/0174083 | A1 | 6/2014 | Gerstler et al. |
| 2019/0143809 | A1 * | 5/2019 | Leidefeldt ............ B60K 15/035 280/830 |

FOREIGN PATENT DOCUMENTS

| | | |
|---|---|---|
| DE | 19533863 A1 | 3/1997 |
| DE | 10202165 A1 | 7/2003 |
| WO | 2012040835 A1 | 4/2012 |
| WO | 2016172803 A1 | 11/2016 |

OTHER PUBLICATIONS

International Search Report and Written Opinion for International Patent Application No. PCT/EP2017/081004, dated May 18, 2018, 9 pages.

First Office Action for Chinese Patent Application No. 201780074184.8, dated Jul. 3, 2020, 18 pages.

* cited by examiner

FUEL TANK ARRANGEMENT WITH A GAS BURNING ARRANGEMENT AND A PRESSURE CONTROLLED VALVE TO HEAT AUXILIARY VEHICLE COMPONENTS

This application is a 35 USC 371 national phase filing of International Application No. PCT/EP2017/081004, filed Nov. 30, 2017, which claims priority to International Application No. PCT/EP2016/079409, filed Dec. 1, 2016, the disclosures of which are incorporated herein by reference in their entireties.

TECHNICAL FIELD

The present invention relates to a fuel tank arrangement. The invention also relates to a vehicle comprising such a fuel tank arrangement. The invention is applicable on vehicles, in particularly low, medium and heavy duty vehicles commonly referred to as trucks. Although the invention will mainly be described in relation to a truck, it may also be applicable for other type of vehicles such as e.g. working machines, buses, boats etc.

BACKGROUND

In relation to propulsion systems for heavy duty vehicles, internal combustion engines are frequently used. These internal combustion engines are most often propelled by a combustible fluid such as e.g. diesel or petrol. However, in order to further reduce engine emissions of the vehicles, alternative propulsion methods and/or fuels are being used, either alone or in combination with the well known combustible fluids. These may include, for example, ethanol or electrical propulsion from an electric machine, etc.

As a further alternative, a combustible gas, such as e.g. compressed natural gas, DME, biogas, etc. has been found a suitable propulsion fuel for vehicles in the form of trucks. The combustible fluids can be used in combination with the combustible gas for propelling the internal combustion engine, in the following also referred to as a dual fuel internal combustion engine. Since the residuals from the combustible gas are relatively environmentally friendly in comparison to e.g. diesel fuel, pollution from the emissions thereof is reduced for these types of engines.

A problem with engines being propelled by the above described combustible gas is that if leakage of gas occurs from e.g. the fuel tank or other positions of the system there is a risk of green house gas emission. Unwanted leakage of this kind also has an economical aspect since the fuel consumption will increase.

There is thus a need to provide an improved fuel tank arrangement for reducing emission of such gases to the atmosphere.

SUMMARY

It is an object of the present invention to provide a fuel tank arrangement which at least partially overcomes the above described deficiencies. This is achieved by a fuel tank arrangement according to claim 1.

According to a first aspect of the present invention, there is provided a fuel tank arrangement for an internal combustion engine of a vehicle, the fuel tank arrangement comprising a fuel tank arranged to contain a combustible gas, wherein the fuel tank arrangement further comprises a combustible gas burning arrangement for combustion of combustible gas, the combustible gas burning arrangement being positioned in downstream fluid communication with the fuel tank via a first conduit.

The wording "combustible gas" should in the following and throughout the entire description be interpreted as a gas which can be ignited, either self-ignited by compression or be ignited by e.g. a spark plug. The invention should thus not be limited to any specific combustible gas. However, as a non-limiting example, the combustible gas may preferably be natural gas, such as liquefied natural gas (LNG). The combustible gas which can be provided in the fuel tank can be in liquid phase and in gas phase. Hence, the wording "combustible gas" should be interpreted to include liquefied gas as well as gas in gas phase. Accordingly, a lower portion of the fuel tank can be provided with liquefied combustible gas while an upper portion of the fuel tank can be provided with combustible gas in gas phase. The combustible gas burning arrangement is thus an arrangement which combusts a combustible gas. Such arrangement may, for example, be a catalytic oxidation burner or a fuel cell burner, etc.

Moreover, the wording "in fluid communication" should be construed as being valid for liquids as well as gases. Hence, fluid communication should be understood to mean that a liquid or gas can be delivered to a specific component. According to the above description, the combustible gas in gas phase may thus have a passage from the fuel tank to the combustible gas burning arrangement.

An advantage is that a reduction leakage of gases which may be harmful to the environment is reduced. This is due to the fact that the combustible gas burning arrangement is positioned to combust the relatively environmentally harmful combustible gas downstream the fuel tank in the event of controlled and/or uncontrolled leakage. The products from the combustible gas are less harmful to the environment after combustion thereof, whereby emissions downstream the combustible gas burning arrangement is preferable. Also, and as will be described further below, using a combustible gas burning arrangement according to the present invention is advantageous as the heat generated therefrom may be used for other components/arrangements of the vehicle, which serves for further benefits thereof.

Furthermore, the combustible gas burning arrangement may be operated by means of supplying combustible gas thereto. The combustible gas burning arrangement may be operated and started up at a relatively low gas pressure level, such as e.g. below 0.5 bar gauge pressure. Hence, when supplying combustible gas to the combustible gas burning arrangement at such low gas pressure levels, the combustible gas burning arrangement is started up and can initiate combustion of the gases. The combustible gas burning arrangement is thus a low gas pressure controlled gas burning arrangement. An advantage is that the combustible gas burning arrangement can be operated even if the vehicle is standing still and the internal combustion engine is turned off. Hence, the engine system and other auxiliary systems of the vehicle can be kept warm, or be heated, even when the internal combustion engine has been turned off for a relatively extensive time period.

According to an example embodiment, the combustible gas burning arrangement may be further arranged in fluid communication with the fuel tank via a second conduit.

Hence, the gas burning arrangement is connected to the fuel tank via two separate conduits.

According to an example embodiment, the fuel tank arrangement may further comprise a pressure regulator positioned in downstream fluid communication with the fuel tank, wherein the pressure regulator is arranged in fluid communication with the combustible gas burning arrangement via the second conduit.

According to an example embodiment, the fuel tank arrangement may further comprise gas converter arrangement comprising a fuel pump and an evaporating unit, the gas converter arrangement being positioned in downstream fluid communication with the fuel tank and arranged to convert liquefied combustible gas to compressed combustible gas for delivery to the internal combustion engine, wherein the gas burning arrangement is arranged in fluid communication with the gas converter arrangement via the second conduit.

The gas converter arrangement is, as described above, arranged to convert liquefied combustible gas to compressed combustible gas. The combustible gas in the fuel tank is provided at relatively low pressure levels, while the combustible gas delivered to the internal combustion engine, or the fuel injector(s) of the internal combustion engine, should preferably be provided in gaseous phase at relatively high pressure levels. The gas converter arrangement thus enables for the provision of combustible gas from the fuel tank to the internal combustion engine.

A further advantage is that the combustible gas burning arrangement can be operated by combustible gas received directly from the fuel tank, as well as combustible gas from the gas converter arrangement, i.e. combustible gas received from the fuel pump and evaporating unit.

According to an example embodiment, the fuel tank arrangement may comprise a valve arrangement positioned in fluid communication between the gas converter arrangement and the combustible gas burning arrangement via the second conduit.

Hereby, the valve can control supply of combustible gas to the combustible gas burning arrangement.

According to an example embodiment, the valve arrangement may be further arranged in fluid communication between the fuel tank and the combustible gas burning arrangement via the first conduit.

According to an example embodiment, the valve arrangement may be controllable between an open state in which combustible gas is provided to the combustible gas burning arrangement, and a closed state in which combustible gas is prevented from reaching the combustible gas burning arrangement, wherein the valve arrangement is arranged to be positioned in the open state when exposed to a gas pressure level above a predetermined threshold limit and/or by means of receipt of an electronic control signal.

According to an example embodiment, the fuel tank arrangement may further comprise an additional valve arrangement positioned downstream the gas burning arrangement for receiving heated combustible gases generated in the gas burning arrangement, and a control unit connected to the additional valve arrangement.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Hereby, and as will be described further below, heat generated by the combustible gas burning arrangement can be distributed, via the additional valve, to various auxiliary vehicle components of the vehicle.

According to an example embodiment, the fuel tank arrangement may further comprise at least one auxiliary vehicle component arranged downstream the additional valve arrangement for being controllably heated by the heat generated by the gas burning arrangement, the control unit being connected to the valve arrangement and to the at least one least one auxiliary vehicle component, the control unit being configured to receive a signal indicative of a heating requirement for the at least one auxiliary vehicle component; and if the heating requirement for the at least one auxiliary vehicle component is above a predetermined threshold: control the valve arrangement to be positioned in the open state for feeding combustible gas to the gas burning arrangement for operation thereof.

The wording "heating requirement" should be understood to mean that the auxiliary component is in need of heat. The heat may be needed for improving the functionality of the auxiliary vehicle component, or for improving the functionality of another component connected to the auxiliary vehicle component.

The auxiliary vehicle components may, for example, include an exhaust aftertreatment system, the cabin, or even the internal combustion engine. Other alternative auxiliary vehicle components are also conceivable and will be described in further detail below.

Hereby, when an auxiliary vehicle component is in need of, or desires an increased temperature level, the valve arrangement can be arranged in the open position for starting the gas burning arrangement. Heat generated by the gas burning arrangement can then be provided to the auxiliary vehicle component.

According to an example embodiment, the additional valve arrangement may be connected to a plurality of auxiliary vehicle components for controllably delivery of heat generated by the gas burning arrangement to the plurality of auxiliary vehicle components.

According to an example embodiment, the control unit may be further configured to determine which one of the plurality of auxiliary vehicle components having a heating requirement above the predetermined threshold; and control the additional valve arrangement such that heat from the gas burning arrangement is provided to the auxiliary component having a heating requirement above the predetermined threshold.

Hereby, the additional valve arrangement can control the flow of heated gas to the auxiliary vehicle components in need of such heat.

According to an example embodiment, the first conduit may be connected to an upper portion of the fuel tank for receiving combustible gas in gas phase from the fuel tank.

As described above, this allows for venting of the fuel tank when the pressure level of the combustible gas in the fuel tank exceeds a predetermined limit.

According to an example embodiment, the fuel tank arrangement may further comprise a heat exchanger arrangement, the heat exchanger arrangement being positioned in downstream fluid communication with the combustible gas burning arrangement for heating a first auxiliary component of the vehicle.

As stated above, the auxiliary components may, for example, include an exhaust aftertreatment system, the cabin, or even the internal combustion engine. Hence, heat from the heat exchanger arrangement may be used for heating the exhaust aftertreatment system and/or the internal combustion engine for reducing cold start emissions, heat the cabin in cold climates, etc. As a further example, the heat exchanger arrangement may be used for generating electricity in combination with a turbine, thermo-electricity or other type of devices. As a still further example, the heat exchanger arrangement may also be used for heating a fluid, such as water used by the evaporating unit.

According to an example embodiment, the first auxiliary component may be the gas converter arrangement, the gas converter arrangement being arranged in downstream fluid communication with the heat exchanger arrangement for heating combustible gas provided to the gas converter arrangement from the fuel tank.

Hereby, the compressed combustible gas can be heated before provided to the fuel injection and into the cylinders of the internal combustion engine. An advantage is that problems associated with cold starts of the internal combustion engine can be reduced.

According to an example embodiment, the fuel tank arrangement may further comprise an additional valve arrangement positioned in fluid communication between the combustible gas burning arrangement and the heat exchanger arrangement for controllably delivery of heated combusted gas to the heat exchanger arrangement.

Thus, heat from the combustible gas burning arrangement can be delivered to the heat exchanger arrangement when there is a desire of doing so. The additional valve may also, as will be described below, be able to by-pass the heat exchanger arrangement such that the combustible gas burning arrangement directly heats the auxiliary components of the vehicle. This may be advantageous as heating of the auxiliary components, such as the engine aftertreatment system, may be executed more rapidly. Accordingly, according to an example embodiment, the additional valve arrangement may be arranged to by-pass the heat exchanger arrangement.

According to an example embodiment, the fuel tank arrangement may further comprise a second auxiliary vehicle component, the second auxiliary vehicle component being a cooling arrangement for cooling further auxiliary components of the vehicle, the cooling arrangement being connected to a heat source for energization thereof.

As described above, the cooling arrangement may be arranged to e.g. cool the cabin during hot climates, etc. The cooling arrangement may, for example, be an adsorption cooler or an absorption cooler, etc. The cooling arrangement is advantageous as it does not require the use of vehicle electricity for energization thereof as it uses the overflow of heat from the vehicle. Hence, the waste heat from the combustion of the internal combustion engine can be used for energization of the cooling arrangement.

According to an example embodiment, the cooling arrangement may thus be arranged in downstream fluid communication with the combustible gas burning arrangement.

Hereby, the cooling arrangement is efficiently utilizing the heat generated by the combustible gas burning arrangement.

According to an example embodiment, the cooling arrangement may be connected to an exhaust system of the vehicle upstream an engine exhaust gas aftertreatment system. Hereby, the heat provided to the cooling arrangement is further directed to the exhaust system of the vehicle. Hereby, the engine exhaust gas aftertreatment system is heated thus improving the functionality of the engine exhaust gas aftertreatment system.

According to an example embodiment, the cooling arrangement may be connected to an exhaust system of the vehicle downstream an engine exhaust gas aftertreatment system.

Hereby, the cooling arrangement can be energized/regenerated by the heat from the exhaust gases of the internal combustion engine. Accordingly, the waste heat from the internal combustion engine can be used for cooling purposes of the vehicle during operation of the internal combustion engine.

According to a second aspect, there is provided a method for controlling a fuel tank arrangement for an internal combustion engine of a vehicle, the fuel tank arrangement comprising a fuel tank comprising a combustible gas, and a combustible gas burning arrangement positioned in downstream fluid communication with the fuel tank via a first conduit, the method comprising the steps of determining that at least one auxiliary vehicle component is in need of an increased temperature level and/or the fuel tank is in need of ventilation; and providing the gas in at least one of the first and second conduits to the gas burning arrangement for combustion therein.

The step of providing gas to the gas burning arrangement may preferably be made by means of an increased pressure exposed to a pressure controlled valve, or by opening the valve using an electronic control signal.

Effects and features of the second aspect are largely analogous to those described above in relation to the first aspect.

According to third aspect, there is provided a vehicle comprising an internal combustion engine and a fuel tank arrangement according to any of the example embodiment described above in relation to the first aspect of the present invention, wherein the internal combustion engine is arranged downstream the fuel tank arrangement.

According to an example embodiment, the internal combustion engine may be a dual fuel internal combustion engine.

Effects and features of the second aspect are largely analogous to those described above in relation to the first aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
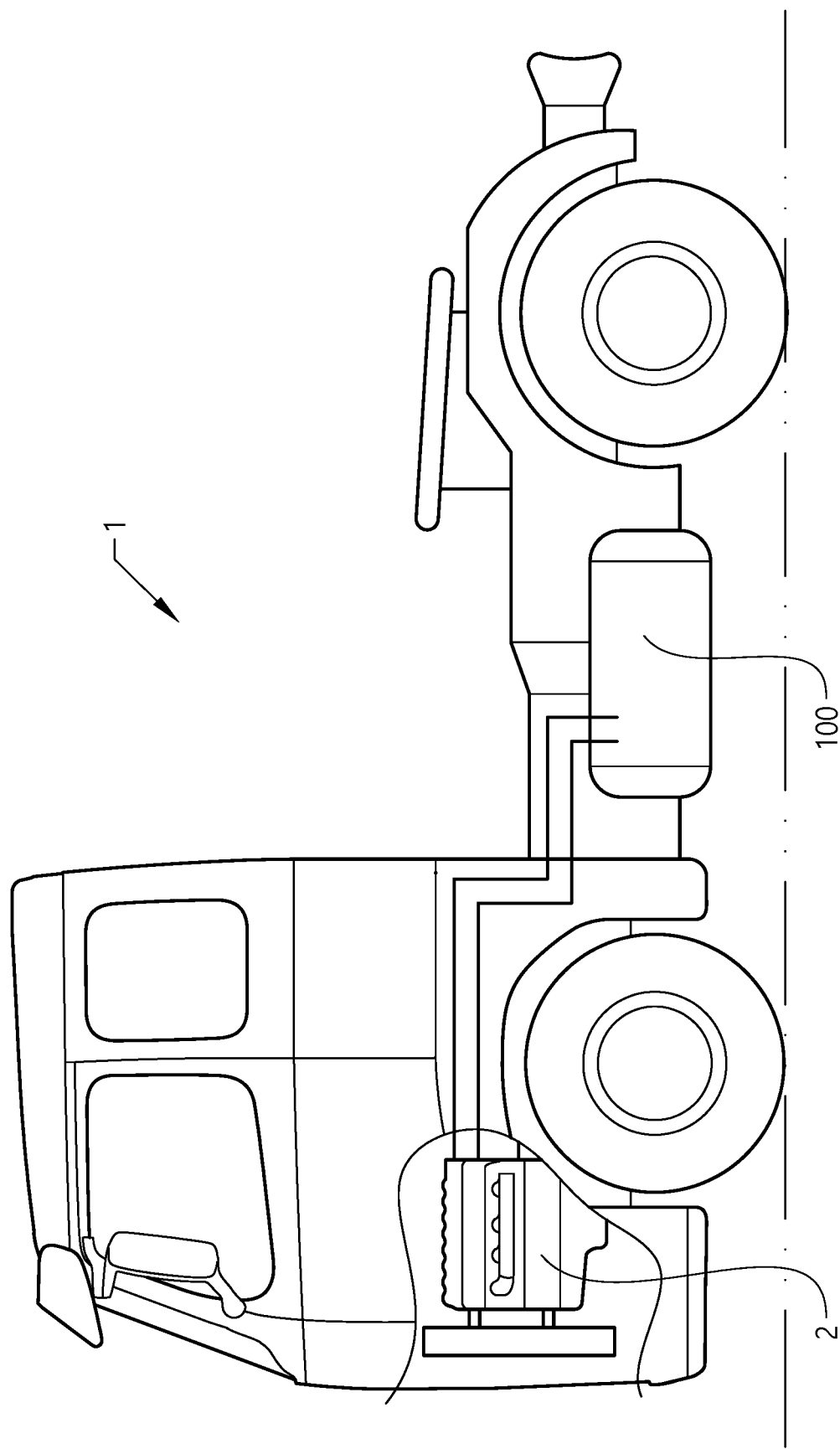
FIG. 1 is a lateral side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 comprising an internal combustion engine 2. The internal combustion engine 2 may, for example, be a dual fuel internal combustion engine 2 which is connected to a fuel tank, such as e.g. a diesel tank, and to a fuel tank arrangement 100, which fuel tank arrangement 100 will be described in further detail below. The internal combustion engine 2 may thus be propelled by both conventional fuels such as e.g. diesel or petrol, as well as by a combustible gas such as e.g. compressed natural gas, LNG, etc. The combustible gas may be provided either in a liquid phase i.e. a liquid/liquefied combustible gas, or in a gas phase. The vehicle 1 depicted in FIG. 1 is a heavy duty vehicle 1, here in the form of a truck, for which the inventive fuel tank arrangement 100 is particularly suitable for.

Figure 2:
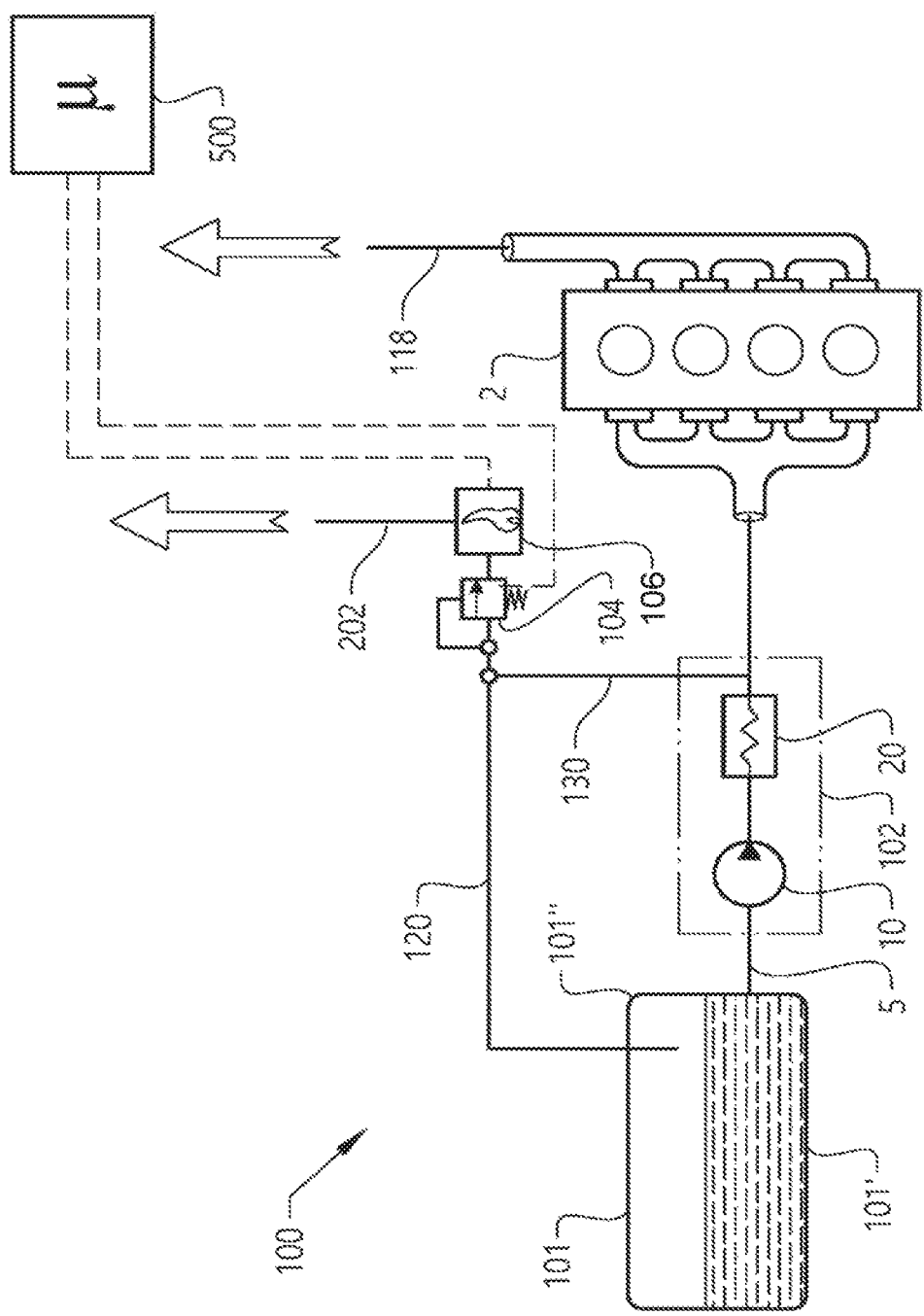
FIG. 2 is a schematic view illustrating a fuel tank arrangement according to an example embodiment of the present invention.

Now, with reference to FIG. 2, a schematic view of the fuel tank arrangement 100 according to an example embodiment is depicted. As can be seen in FIG. 2, the fuel tank arrangement 100 comprises a fuel tank 101 provided with a combustible gas. A lower portion 101' of the fuel tank 101 comprises liquefied combustible gas while an upper portion 101" of the fuel tank 101 comprises combustible gas in gas phase. The combustible gas in the fuel tank 101 is thus arranged to supply combustible gas to e.g. the fuel injector(s) of the internal combustion engine 2 for propulsion thereof. As a non-limiting example, the fuel tank may be pressurized between 0-16 bar. The exhaust gas from the internal combustion engine 2 is directed through an exhaust system 118 of the vehicle 1.

The fuel tank arrangement 100 further comprises a gas converter arrangement 102 positioned downstream the fuel tank 101. In more detail, the gas converter arrangement 102 is connected to the lower portion 101' of the fuel tank 101 via a conduit 5. Hereby, liquefied combustible gas is provided to the gas converter arrangement 102. The gas converter arrangement 102 is arranged to pressurize and evaporate the liquefied combustible gas to pressurized combustible gas in gas phase. Such pressurized and evaporated combustible gas is suitable for being provided to the cylinders of the internal combustion engine 2. The gas pressure level of the combustible gas downstream the gas converter arrangement 102 is preferably between 300-550 bar. The gas converter arrangement 102 may preferably comprise a fuel pump 10 and an evaporating unit 20, which evaporating unit 20 is arranged downstream the fuel pump 10. The fuel pump 10 may preferably be a high pressure fuel pump 10 arranged to increase the pressure of the liquefied combustible gas to approximately 300-550 bar. The internal combustion engine 2 is thus arranged downstream the gas converter arrangement 102 for receiving pressurized combustible gas in gas phase.

Moreover, the fuel tank arrangement 100 further comprises a combustible gas burning arrangement 106. The combustible gas burning arrangement 106 is arranged downstream the fuel tank 101 via a first conduit 120. In detail, the first conduit 120 is connected to the upper portion 101" of the fuel tank 101 for directing low pressure combustible gas in gas phase to the combustible gas burning arrangement 106. Although not depicted, the gas burning arrangement 106 may comprise means for directing flow of air into the gas burning arrangement 106. The combustible gas burning arrangement 106 is operated from low pressure levels, such as from 0.3 bar gauge pressure. Thus, when receiving combustible gas, the combustible gas burning arrangement 106 is ignited and started up for burning the combustible gas. The combustible gas burning arrangement 106 is thus arranged to combust the combustible gas delivered from the fuel tank 101 via the first conduit 120. Hereby, when the gas pressure level in the fuel tank 101 exceeds a predetermined limit, i.e. when the pressure level in the fuel tank 101 is too high, the fuel tank 101 can be vented by directing combustible gas in gas phase to the combustible gas burning arrangement 106 for combustion thereof. This is more environmentally friendly in comparison to venting the combustible gas into the atmosphere. Also, the heat generated by combusting the combustible gas in the combustible gas burning arrangement 106 can be used for e.g. heating auxiliary components of the vehicle 1, as will be described further below.

Furthermore, the combustible gas burning arrangement 106 is also arranged in downstream fluid communication with the gas converter arrangement 102 via a second conduit 130. Hereby, also pressurized combustible gas in gas phase can be directed to the combustible gas burning arrangement 106. In particular, during change of engine load, the injection into the cylinders of the internal combustion engine 2 may be changed from high-pressure injection to low-pressure injection, whereby an over-pressure can be relieved into the combustible gas burning arrangement 106 via the second conduit 130. The second conduit 130 is thus, as depicted in FIG. 2, connected downstream the gas converter arrangement 102.

As further depicted in FIG. 2, the fuel tank arrangement 100 also comprises a valve arrangement 104 in fluid communication between the combustible gas burning arrangement 106 and the first 120 and second 130 conduits, respectively. The valve arrangement 104 may be a pressure controlled valve which is arranged to be positioned in the open position if the gas pressure level in either the first 120 or the second 130 conduits exceeds a predetermined limit. The valve arrangement 104 may also, in addition be electronically controlled by means of a control unit 500, which control unit 500 is arranged to open and close the valve arrangement 104 in response to a signal indicative of a heating requirement for the auxiliary components as will be described further below. The control unit 500 is also connected to the combustible gas burning arrangement 106 for controlling operation thereof.

Figure 3:
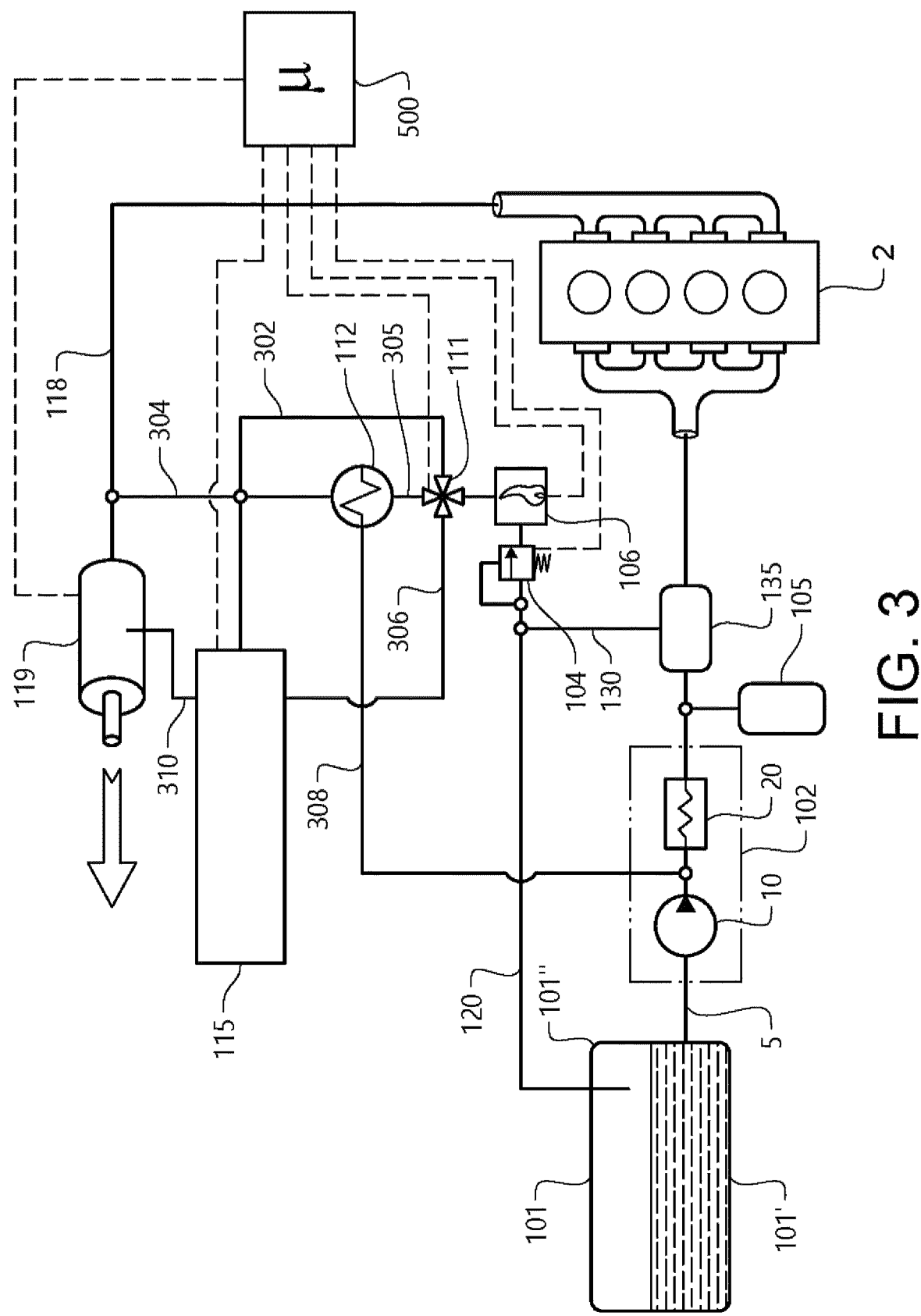
FIG. 3 is a schematic view illustrating a fuel tank arrangement according to another example embodiment of the present invention.

Reference is now made to FIG. 3 which is a schematic view illustrating the fuel tank arrangement 100 according to another example embodiment. As can be seen in FIG. 3, the fuel tank arrangement 100 further comprises an additional fuel tank 105 arranged downstream the gas converter arrangement 102 via the second conduit 130. The additional fuel tank 105 is preferably a high pressure fuel tank arranged to contain combustible gas at a pressure level of approximately 100-500 bar. Moreover, the additional fuel tank 105 is arranged upstream the combustible gas burning arrangement 106. Hereby, the additional fuel tank 105 is arranged as a buffer tank for receiving combustible gas. The additional fuel tank 105 can thus be arranged to compensate for pressure variations caused by the pump 10. Also, the fuel tank arrangement 100 further comprises a pressure regulator 135 downstream the gas converter arrangement 102 and arranged in fluid communication with the second conduit 130. By means of the pressure regulator 135, combustible gas can be controllably returned to the fuel tank 101 via the first 120 and second 130 conduits.

Furthermore, and as described above, the fuel tank arrangement 100 may also comprise the valve arrangement 104 arranged downstream the first conduit 120 and the second conduit 130. The valve arrangement 104 may be arranged in connection to e.g. the gas pedal of the vehicle, or be controlled in conjunction with the rotational speed variations of the internal combustion engine. Hereby, when there is an overpressure between the valve arrangement 104 and the internal combustion engine 2, the valve arrangement 104 can be positioned in the opened state to lower the pressure between the gas converter arrangement 102 and the internal combustion engine 2. The pressure level is subsequently lowered to an acceptable pressure level of the system.

Figure 4:
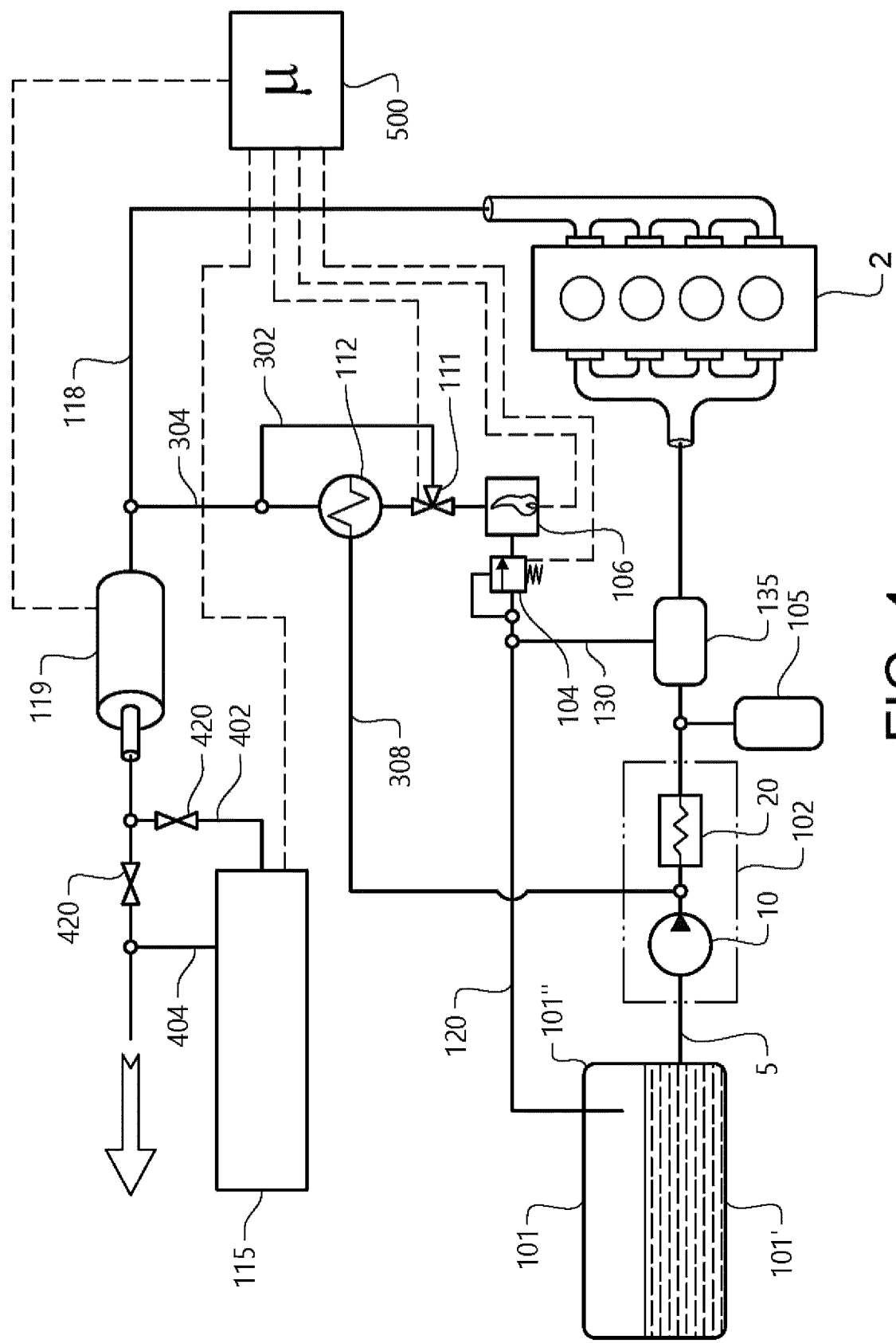
FIG. 4 is a schematic view illustrating a fuel tank arrangement according to a further example embodiment of the present invention.

Still further, the fuel tank arrangement 100 comprises auxiliary vehicle components in the form of a heat exchanger arrangement 112 and a cooling arrangement 115 arranged in downstream fluid communication with the combustible gas burning arrangement 106. In the example embodiment depicted in FIG. 3, an additional valve arrangement 111 is arranged downstream the combustible gas burning arrangement 106 for controllably delivery of heat generated in the combustible gas burning arrangement 106 to the heat exchanger arrangement 112, via a conduit 305 and/or the cooling arrangement 115, via a conduit 306. The additional valve arrangement 111 may also be arranged to by-pass the heat exchanger arrangement 112, by means of a conduit 302. Accordingly, the additional valve arrangement 111 may be a three-way valve. It should however be readily understood that the additional valve arrangement 111 may be formed by three separately controlled valves as well. Also, the by-passing of the heat exchanger arrangement 112 may be omitted and the cooling arrangement 115 may be positioned at a different location as depicted in FIG. 4, and thus not arranged in downstream fluid communication with the combustible gas burning arrangement 106.

The heat exchanger arrangement 112 can thus receive heat from the combustible gas burning arrangement 106. Hereby, engine coolant or other type of cooling liquid can be directed through, and heated by the heat exchanger arrangement 112. The heated coolant/liquid can thereafter be delivered downstream the heat exchanger arrangement 112 to the gas converter arrangement 102, via a conduit 308, for heating the pressurized combustible gas. Hereby, the pressurized combustible gas delivered to the internal combustion engine 2 is heated which reduces the problems associated with cold start engines, etc. In particular, this can be achieved by positioning valves (not shown) in an engine coolant circuit (not shown) in a closed position such that the small amount of engine coolant still present in the heat exchanger arrangement 112 can be quickly and efficiently heated. Further, efficiently cooling the evaporating unit 20 enables the use of a smaller and simpler evaporating unit 20. This will save valuable space in the relatively tight compartment of the fuel tank arrangement 100, as well as reducing the overall costs. Furthermore, the heated coolant from the heat exchanger arrangement 112 may also be used for heating the cabin of the vehicle 1, especially during cold climates.

As described above, the cooling arrangement 115 is arranged downstream the combustible gas burning arrangement 106 according to the embodiment depicted in FIG. 3. The cooling arrangement 115 in FIG. 3 is thus energized/regenerated by means of heat from the combustible gas burning arrangement 106. Accordingly, the cooling arrangement 115 uses the heat from the combustible gas burning arrangement 106 to energization/regeneration thereof such that a fluid provided into the cooling arrangement 115 can be cooled. Such a cooling arrangement may be an adsorption cooler or absorption cooler. The cooling arrangement 115 may be arranged in fluid communication with e.g. auxiliary vehicle components in the form of e.g. a refrigerator or the air conditioner system, etc. such that the fluid cooled by the cooling arrangement 115 is used for cooling these arrangements. The heat provided to the cooling arrangement 115 is further directed to an auxiliary vehicle components in the form of the exhaust gas system 118 upstream the engine exhaust gas aftertreatment system 119 after energization/regeneration of the cooling arrangement 115, via a conduit 304. The cooling arrangement 115 may also be connected to exhaust gas system 118 via a conduit 310 for energization of waste heat gases from the internal combustion engine 2.

Moreover, the heat exchanger arrangement 112 may also be by-passed by controlling the additional valve arrangement 111 accordingly. Hereby, heat from the combustible gas burning arrangement 106 can be directed to the exhaust gas system 118 of the vehicle 1. In particular, heat from the combustible gas burning arrangement 106 can be provided to the exhaust gas system 118 upstream the engine exhaust gas aftertreatment system 119 of the vehicle 1 via the conduit 304. Hereby, the functionality of the engine exhaust gas aftertreatment system 119 can be increased as it may function better when being warmer. Moreover, the engine exhaust gas aftertreatment system 119 can be heated more quickly during engine cold start, and heating the engine exhaust gas aftertreatment system 119 even when the internal combustion engine 2 is turned off. Also heat from the heat exchanger arrangement 112 may be provided to the exhaust gas system 118 upstream the engine exhaust gas aftertreatment system 119. As an alternative option, heat from the combustible gas burning arrangement 106 may also be provided to a housing (not shown) of the engine exhaust gas aftertreatment system 119. Such housing may be referred to as a resonance box, etc. Hereby, the engine exhaust gas aftertreatment system 119 is heated and not the exhaust gases delivered into the engine exhaust gas aftertreatment system 119.

As depicted in FIG. 3, the control unit 500 is connected to the additional valve arrangement 111, the cooling arrangement 115, and to the engine exhaust gas aftertreatment system 119. Hereby, the control unit 500 can control the operation of the additional valve arrangement 111 based on control signals received from the auxiliary vehicle components.

In order to describe a further alternative example embodiment, reference is made to FIG. 4. The difference between the embodiments depicted in FIG. 4 in comparison to the embodiment in FIG. 3 is the position of the cooling arrangement 115.

As depicted in FIG. 4, the cooling arrangement 115 is no longer arranged in downstream fluid communication with the combustible gas burning arrangement 106. Hereby, the additional valve arrangement 111 may be a two-way valve instead of the above described three-way valve. Instead of positioning the cooling arrangement 115 in downstream fluid communication with the combustible gas burning arrangement 106, the cooling arrangement 115 is connected to the exhaust gas system 118 downstream the engine exhaust gas aftertreatment system 119. Hereby, the cooling arrangement 115 is arranged to receive heat from the exhaust gases for energization/regeneration thereof, via a conduit 402. The heat provided to the cooling arrangement 115 is further directed to the exhaust gas system downstream the engine exhaust gas aftertreatment system 119 after energization/regeneration of the cooling arrangement 115, via a conduit 404. In order to controllably deliver heat to the cooling arrangement 115, a valve arrangement 420 is arranged in fluid communication between the engine exhaust gas aftertreatment system 119 and the cooling arrangement 115. Hereby, the exhaust gases can be directed to either the cooling arrangement 115 or out through the exhaust gas system 118 to the atmosphere. The valve arrangement 420 may comprise to separate valves or be arranged in the form of a two-way valve. By positioning the cooling arrangement 115 as depicted in FIG. 4, the waste heat in the exhaust system 118 can be used for energization/regeneration of the cooling arrangement 115.

Figure 5:
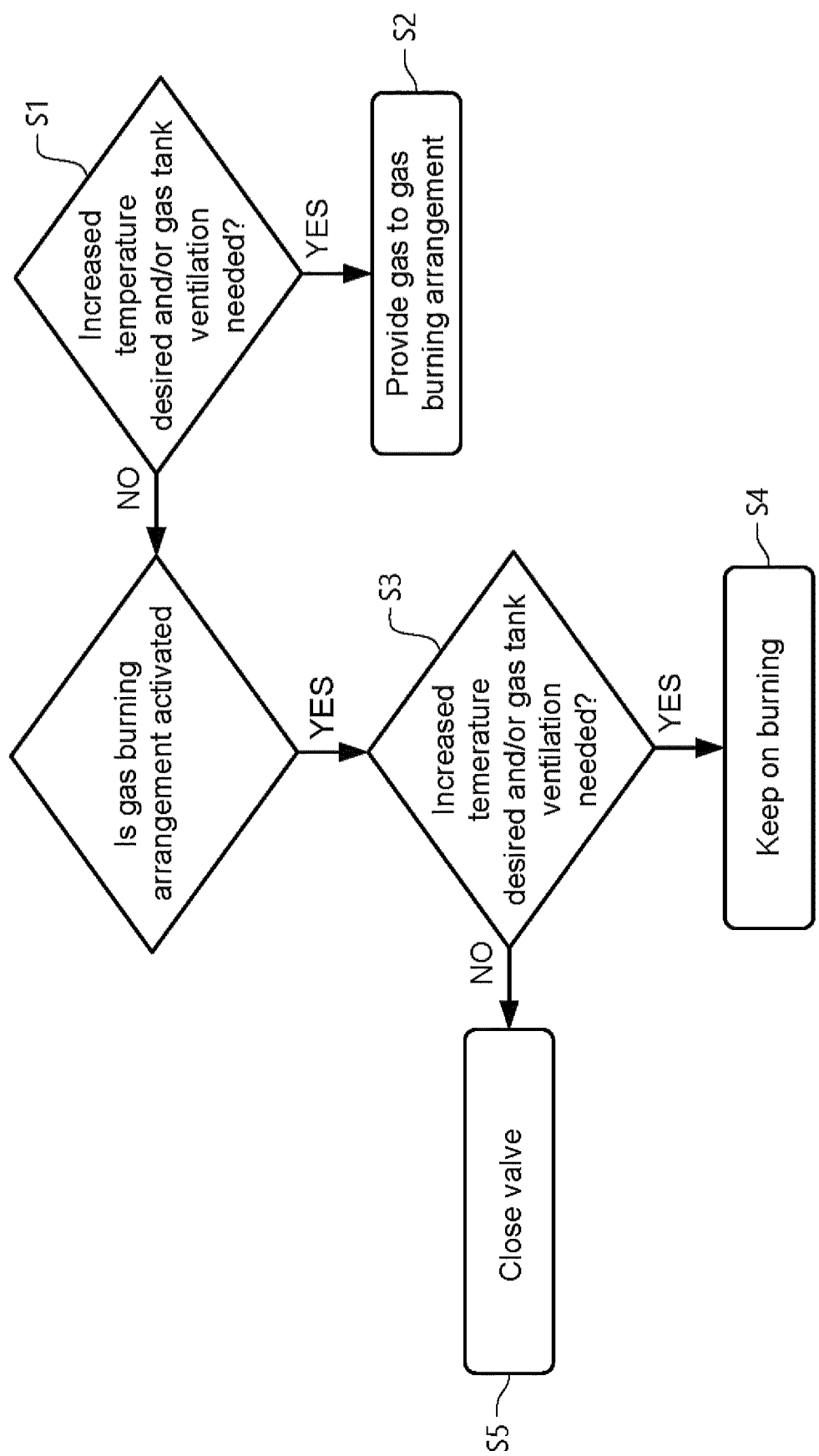
FIG. 5 is a flow chart illustrating a method for controlling a fuel tank arrangement according to an example embodiment.

Finally, reference is made to FIG. 5 which is a flow chart of a method for controlling the above described fuel tank arrangement according to an example embodiment. During operation, it is determined S1 if at least one of the above described auxiliary vehicle components is in need of an increased temperature level and/or if the fuel tank 101 is in need of ventilation. The increased temperature level may, for example be that the exhaust gas system is in need of an increased temperature level, or that the cabin needs to be heated or cooled. In the latter case, the heat source of the cooling arrangement 115 can be in need of an increased temperature level. Also, the coolant may need to be heated, etc. If it is determined that increased temperature level is desired and/or fuel tank ventilation is needed, gas is provided S2 to the gas burning arrangement. This is preferably controlled by positioning the valve arrangement 104 in the open position and activating the gas burning arrangement 106. However, if it is determined that no increased temperature level is desired and/or fuel tank ventilation is needed, it is determined if the gas burning arrangement is activated. It is then again determined if an increased temperature level is desired and/or fuel tank ventilation is needed. If so, the gas burning arrangement is kept in a burning state S4. If not, the valve arrangement 104 is arranged in the closed position and the gas burning arrangement 106 is turned off.

It is to be understood that the present invention is not limited to the embodiments described above and illustrated in the drawings; rather, the skilled person will recognize that many changes and modifications may be made within the scope of the appended claims. For example, the fuel tank arrangement 100 may comprise a variety of valves for controlling flow of combustible gas therein. Such valves may e.g. be controlled mechanically or electrically.

The invention claimed is:

1. A fuel tank arrangement for an internal combustion engine of a vehicle, the fuel tank arrangement comprising:
a fuel tank configured to contain a combustible gas;
a combustible gas burning arrangement for combustion of combustible gas, said combustible gas burning arrangement in downstream fluid communication with the fuel tank via a first conduit for receiving combustible gas from the fuel tank, the combustible gas burning arrangement in fluid communication with the fuel tank via a second conduit;
a pressure controlled valve arrangement in fluid communication between the gas burning arrangement and the first and second conduits, respectively, the pressure controlled valve arrangement configured to be in an open state if the gas pressure level in either the first or the second conduits exceeds a predetermined limit;
an additional valve arrangement positioned downstream from the gas burning arrangement for receiving heated combustible gases generated in the gas burning arrangement;
at least one auxiliary vehicle component arranged downstream the additional valve arrangement configured to be controllably heated by the heat generated by the gas burning arrangement,
a control unit connected to the pressure controlled valve arrangement, the additional valve arrangement, and the at least one least one auxiliary vehicle component; and
a gas converter arrangement comprising a high pressure fuel pump and an evaporating unit, the gas converter arrangement in downstream fluid communication with said fuel tank and configured to convert liquefied combustible gas to compressed combustible gas for delivery to the internal combustion engine,
wherein the gas burning arrangement is in fluid communication with the gas converter arrangement via the second conduit; and
wherein the pressure controlled valve arrangement is positioned in fluid communication between the gas converter arrangement and the combustible gas burning arrangement via the second conduit;
wherein the control unit is configured to:
receive a signal indicative of a heating requirement for the at least one auxiliary vehicle component; and
if the heating requirement for the at least one auxiliary vehicle component is above a predetermined threshold:
control the pressure controlled valve arrangement to be positioned in the open state for feeding combustible gas to the gas burning arrangement for operation thereof.

2. The fuel tank arrangement according to claim 1, further comprising a pressure regulator positioned in downstream fluid communication with the fuel tank, wherein the pressure regulator is arranged in fluid communication with the combustible gas burning arrangement via the second conduit.

3. The fuel tank arrangement according to claim 1, wherein the pressure controlled valve arrangement is further arranged in fluid communication between the fuel tank and the combustible gas burning arrangement via the first conduit.

4. The fuel tank arrangement according to claim 1, wherein the pressure controlled valve arrangement is controllable between the open state in which combustible gas is provided to the combustible gas burning arrangement, and a closed state in which combustible gas is prevented from reaching the combustible gas burning arrangement, wherein the pressure controlled valve arrangement is arranged to be positioned in the open state when exposed to a gas pressure level above a predetermined threshold limit and/or by means of receipt of an electronic control signal.

5. The fuel tank arrangement according to claim 1, wherein the additional valve arrangement is connected to a plurality of auxiliary vehicle components for controllably delivery of heat generated by the gas burning arrangement to the plurality of auxiliary vehicle components.

6. The fuel tank arrangement according to claim 5, wherein the control unit is further configured to:

determine which one of the plurality of auxiliary vehicle components has a heating requirement above the predetermined threshold; and control the additional valve arrangement such that heat from the gas burning arrangement is provided to the auxiliary component having a heating requirement above the predetermined threshold.

7. The fuel tank arrangement according to claim 1, wherein the fuel tank arrangement further comprises a heat exchanger arrangement, said heat exchanger arrangement being positioned in downstream fluid communication with the combustible gas burning arrangement for heating a first auxiliary component.

8. The fuel tank arrangement according to claim 7, wherein the first auxiliary component is the gas converter arrangement, the gas converter arrangement being arranged in downstream fluid communication with the heat exchanger arrangement for heating combustible gas provided to the gas converter arrangement from the fuel tank.

9. The fuel tank arrangement according to claim 7, wherein the additional valve arrangement is arranged to bypass said heat exchanger arrangement.

10. The fuel tank arrangement according to claim 1, wherein the fuel tank arrangement further comprises a second auxiliary vehicle component, said second auxiliary vehicle component being a cooling arrangement for cooling further auxiliary components of the vehicle, said cooling arrangement being connected to a heat source for energization thereof.

11. The fuel tank arrangement according to claim 10, wherein the cooling arrangement is connected to an exhaust system of the vehicle upstream an engine exhaust gas aftertreatment system.

12. The fuel tank arrangement according to claim 10, wherein the cooling arrangement is connected to an exhaust system of the vehicle downstream an engine exhaust gas aftertreatment system.

13. A method for controlling a fuel tank arrangement for an internal combustion engine of a vehicle, the fuel tank arrangement comprising a fuel tank comprising a combustible gas, a combustible gas burning arrangement in downstream fluid communication with the fuel tank via a first conduit and a second conduit, a pressure controlled valve arrangement in fluid communication between the gas burning arrangement and the first and second conduits, respectively, the fuel tank arrangement further comprising a gas converter arrangement comprising a high pressure fuel pump and an evaporating unit, the gas converter arrangement positioned in downstream fluid communication with said fuel tank and configured to convert liquefied combustible gas to compressed combustible gas for delivery to the internal combustion engine, wherein the gas burning arrangement is in fluid communication with the gas converter arrangement via the second conduit and wherein the pressure controlled valve arrangement is in fluid communication between the gas converter arrangement and the combustible gas burning arrangement via the second conduit, the method comprising:

determining that at least one auxiliary vehicle component is in need of an increased temperature level;

in response to determining the need for increased temperature level, providing the combustible gas in at least one of the first and second conduits to the gas burning arrangement via the pressure controlled valve for combustion in the gas burning arrangement;

determining that the fuel tank is in need of ventilation; and in response to determining the need for ventilation, providing the combustible gas in at least one of the first and second conduits to the gas burning arrangement via the pressure controlled valve arrangement for combustion in the gas burning arrangement.

14. The fuel tank arrangement according to claim 1, wherein said internal combustion engine is arranged downstream the fuel tank arrangement.

15. The fuel tank arrangement according to claim 14, wherein the internal combustion engine is a dual fuel internal combustion engine.

\* \* \* \* \*